United States Patent
Hermansen et al.

(10) Patent No.: US 7,827,881 B2
(45) Date of Patent: Nov. 9, 2010

(54) BICYCLE PEDAL

(75) Inventors: Frank Hermansen, Laguna Beach, CA (US); Carl Winefordner, Laguna Beach, CA (US)

(73) Assignee: Crank Brothers, Inc., Laguna Beach, CA (US)

( * ) Notice: Subject to any disclaimer, the term of this patent is extended or adjusted under 35 U.S.C. 154(b) by 1277 days.

(21) Appl. No.: 11/138,134

(22) Filed: May 26, 2005

(65) Prior Publication Data

US 2006/0266154 A1    Nov. 30, 2006

(51) Int. Cl.
B62M 3/00    (2006.01)
(52) U.S. Cl. .................................... 74/594.4; 74/594.6
(58) Field of Classification Search ............... 74/594.4, 74/594.6, 563, 560; F16C 11/04
See application file for complete search history.

(56) References Cited

U.S. PATENT DOCUMENTS

| 579,479 | A | * | 3/1897 | Goebler | 74/594.4 |
|---|---|---|---|---|---|
| 3,320,826 | A | * | 5/1967 | Morse | 74/594.4 |
| 3,811,339 | A | * | 5/1974 | Konzorr | 74/594.4 |
| 4,345,487 | A | * | 8/1982 | Straker | 74/563 |
| 6,128,973 | A | * | 10/2000 | Nagano | 74/594.6 |
| 6,453,771 | B1 | * | 9/2002 | Takahama et al. | 74/594.6 |
| 6,857,337 | B2 | * | 2/2005 | Shuman | 74/594.6 |
| 2009/0095122 | A1 | * | 4/2009 | Weagle | 74/560 |

FOREIGN PATENT DOCUMENTS

EP    0 327 449 A1 *    8/1989

* cited by examiner

Primary Examiner—Vinh T. Luong
(74) Attorney, Agent, or Firm—Haynes and Boone, LLP.

(57) ABSTRACT

A pedal with a body has two opposing plates on different sides of the pedal that can be easily removed or displaced by sliding to access the inner surfaces of the pedal and the backside of traction pins. In this way, traction pins can be replaced even after the pins have been worn out or broken.

26 Claims, 8 Drawing Sheets

BICYCLE PEDAL

BACKGROUND OF THE INVENTION

1. Field of the Invention

The present invention relates generally to the field of bicycles and more particularly to an improved bicycle pedal.

2. Related Art

A number of pedal designs have been made commercially available. Pedal designs include basic pedals and a variety of clipless versions for clamping shoes to pedals. Basic pedal designs range from pedals designed to be used for casual riding, to larger pedals with aggressive traction pins to be used for downhill riding and racing. These larger pedals with aggressive traction pins are generally called "Platform" pedals.

Traction pins are pins that can be added or removed per rider preference, and can be longer or shorter per rider preference. However, in some cases, the pins cannot be replaced after they have become worn down or broken. Platform pedals typically use traction pins that have a hex or screwdriver slot in the heads, and these are usually exposed to impacts and wear that can damage the head. As the head wears, the hex or screwdriver slot becomes more and more difficult to access, making the pins difficult or impossible to remove with the correct tool. Typically, a broken traction pin breaks off at the base of the platform, leaving nothing to grab for removal.

In an attempt to solve the aforementioned problem of traction pin replacement, some platform pedals are designed so that the traction pins are installed from the backside of the outer surface of the platform. The advantage is that the head of the traction pins do not wear, and if the pin breaks off from an impact, the head is still intact for removing the broken pin. The disadvantage is that the location of the traction pins is limited by having to be able to access the head from the backside. For example, the traction pins on one side of the platform cannot be located directly opposite traction pins on the other side of the platform, or else there is no access to install or remove the pins. Also, the platform must be designed to allow access to the heads, and this limits the design of the platform. For example, the platform may have holes or contours on each side the only purpose of which is to allow access to the traction pinheads, even though these holes or contours may compromise the shape of the pedal.

Prior art platform pedal bodies are typically made as a single component, and do not have separate plates as part of their structure. The structure is made of a single material. The wear on platform pedals is uneven, because some portions of the pedal are more prone to contact and impact the ground and rocks than other portions. If the single pedal body component is made of a material that is very strong, then most of the pedal is over-built and expensive. If the pedal body is damaged in one area, then it is relatively expensive to replace the entire pedal body.

Prior art platform pedal bodies are typically either die cast from aluminum or extruded from aluminum and then CNC machined. Die casting costs less but cannot be anodized (usually painted instead) like extruded parts. Anodizing is more durable than paint and aesthetically preferred over paint, but extruded and CNC machined bodies are more expensive primarily because CNC machining is expensive. The one piece three dimensional hollow shape of prior art platform pedals prevents less expensive processes such as stamping that could otherwise reduce or eliminate expensive CNC machining.

SUMMARY

The present invention provides a platform pedal for bikes, which has displaceable first and second plates to better access traction pins at inner surfaces of the pedal for installation and removal of the pins.

The present invention provides a platform pedal for bikes, which has traction pins installed from the inner surface of the pedal platform.

The present invention provides a platform pedal for bikes, which has removable first and second plates made of a material that is different from the material of the pedal body.

The present invention provides a platform pedal for bikes, which has removable first and second plates that can be replaced if damaged.

The present invention provides a platform pedal for bikes, which has removable first and second plates to convert a three-dimensional shaped pedal body into more easily manufactured shapes.

The pedal has upper and lower surfaces each such surface having forward and rear sections. When the plates are more durable or harder, they are placed at the upper rear section and lower forward section where the war is likely to be greatest.

The foregoing and other advantages are attained, according to the present invention, by a platform pedal with first and second plates that slide in and out of the pedal body. Removing or hingedly displacing these plates allows easy access to inner pedal surfaces to install and remove traction pins, while allowing placement of the traction pins in optimal positions. The traction pins can also be removed and replaced if the pins wear down or break during use, because the heads of the traction pins are protected after the plates are installed.

The platform pedal of the present invention allows manufacturing techniques not available on prior art platform pedals. For example, after extruding the body and plates, the holes and cutouts (which are typically used to optimize the weight to strength of the platform) could be stamped instead of machined. Stamping is less costly and faster than machining. It would even be possible to stamp the plates from raw sheet, instead of extruding first, and this could further reduce the cost.

The platform pedal of the present invention has first and second plates that are made from a material that is different from the material of the pedal body, in order to optimize the desired cost or performance characteristics. The different material could be a different alloy or type of material, or it could be the same alloy that is heat treated or processed differently. The plates are analogous to the bumpers of a car and will generally take more abuse during use than the pedal body. It is easy to see that this is true after examining used platform pedals. Therefore, it is desirable for the plates to be as hard and/or strong and/or impact resistant as possible.

There are several reasons to make only the plates with these improved characteristics and not make the entire pedal harder and/or stronger and/or more impact resistant. Materials that are harder or stronger are usually more expensive. For example, 6061-T6 aluminum is a good all-around material for a reasonable cost. However, 6066 aluminum is stronger but costs 40% more. Therefore, it would be advantageous to make the body of 6061-T6 aluminum, and the plates out of 6066 aluminum. It would also be possible to heat treat the 6061-T6 to a harder state such as 6061-T8 at little or no extra cost. This harder state could make a complete pedal too brittle, but works well if only the plates are hardened to this state.

Another example involves making the pedal body out of magnesium and the plates out of aluminum. Magnesium is lighter than aluminum, but costs more and is easier to dent than aluminum. Another example involves making the pedal body from die cast aluminum and making the plates from extruded and CNC machined aluminum. Die-casting is less expensive, but die cast aluminum cannot be anodized, whereas extruded aluminum can be anodized. Anodizing is more durable than painting and other processes available to finish die cast aluminum. In this way, the plates are as durable as possible without the cost of extruding and CNC machining the entire platform pedal.

It would be desirable to employ a plate material that is hard and strong and impact resistant. However, these material properties are not always compatible. Materials that are harder are more scratch and dent resistant, but are usually more brittle than softer materials. If the entire platform pedal is made from a harder material, the pedal could be prone to breaking. However, if only the plates are made from the harder material, then the entire pedal is more likely to withstand severe abuse. Also, because the plates are different components than the pedal body, the platform pedal of the present invention has a desirable appearance because the plates can be a different color from the pedal body.

Materials that are more impact resistant are usually softer. For example, plastics such as Nylon are highly impact resistant, but are less resistant to scratching and wear, and would not support the traction pins as well. An advantage of plastic is that it weighs almost 1/3.sup.rd of aluminum, and costs less, too. A platform pedal with a plastic pedal body and hard aluminum plates would weigh relatively little while providing good resistance to riding abuse. On the other hand, a platform pedal with an aluminum pedal body and plastic plates would have good impact resistance and allow relatively inexpensive replacement of the plastic plates after they are worn out. There are many advantages to having plates and a pedal body, rather than a prior art body.

The platform pedal of the present invention has applications from the very inexpensive up through the most expensive and high performance bicycles. For inexpensive bicycles, the pedal can be made with lower cost materials for the pedal body, because this area takes less wear and tear. The plates can either be made from a less expensive material because they are so easy to replace if damaged, or from more a more durable material that is made from a low cost process such as stamping. For more expensive and high performance bicycles, the body could be made of an extremely light material such as magnesium, and the plates of a stronger (but expensive) material such as stainless steel, 6066 aluminum, or titanium.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which.

The description herein refers to reference numerals in the accompanying drawings.

DETAILED DESCRIPTION

Figure 5:
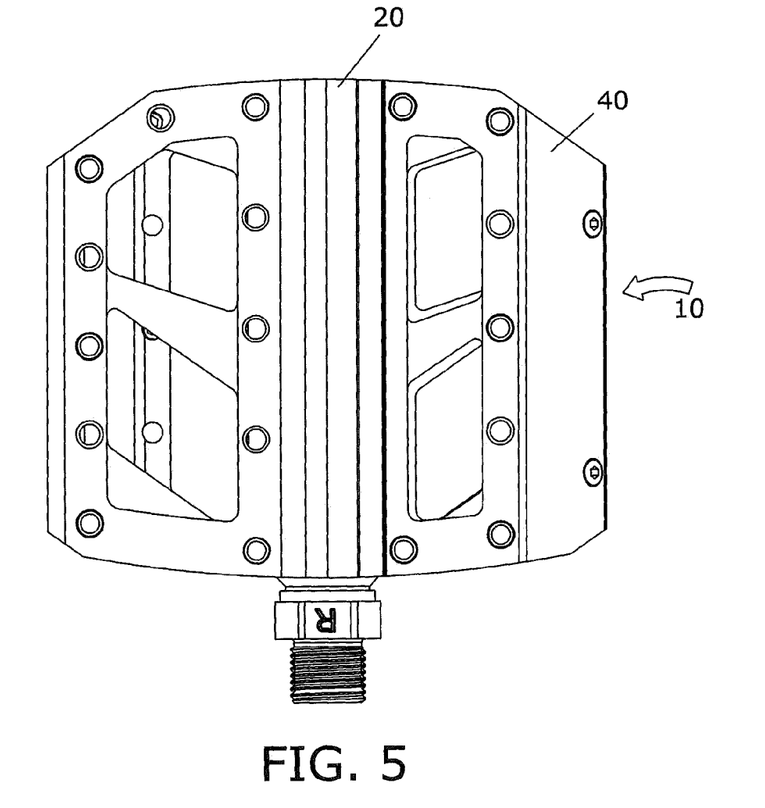
FIG. 5 is a top view of the platform pedal assembly shown in FIG. 4.
Figure 6:
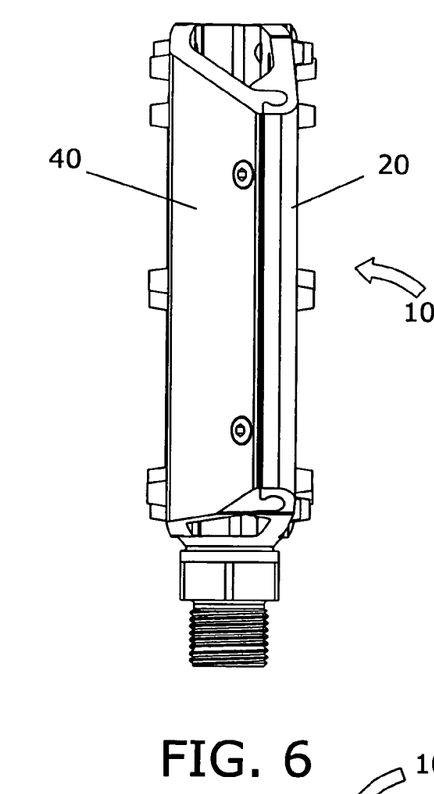
FIG. 6 is a side view of the platform pedal assembly shown in FIG. 5.
Figure 7:
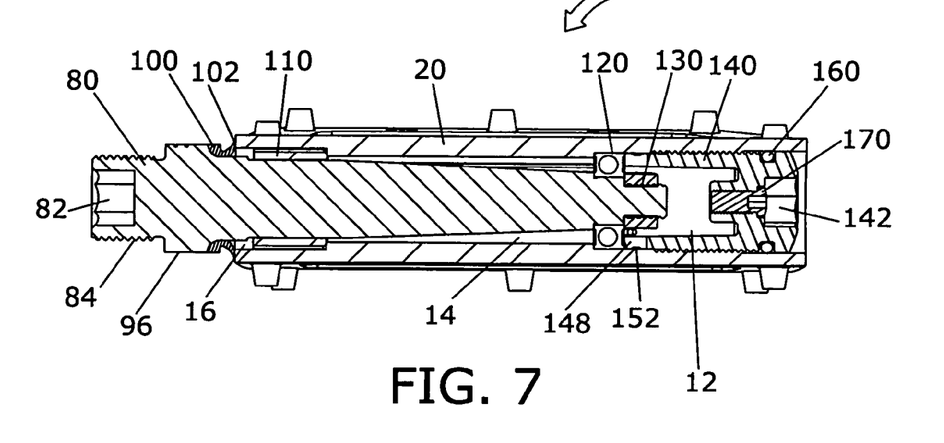
FIG. 7 is a cross sectional view along sectional line 7-7 of the platform pedal assembly shown in FIG. 4.

The present invention may be understood by referring to FIGS. 1-10. By way of example, referring first to FIGS. 2 to 4, it will be seen that the foregoing and other objects are attained, according to the present invention by a pedal 10, which is partially comprised of a body 20, first and second plates 40, traction screws 60, screws 70, and a spindle 80. It can be seen that after the four screws 70 are removed, the first and second plates 40 slide off of body 20. In the preferred embodiment, the two plates 40 are made of a harder, more durable material than material of the body 20. The plates 40 will tend to be impacted and scraped more than the body 20 because of the shape and location of the plates 40. In FIG. 7 a novel regreasing system is shown. This system has a number of advantages over the prior art.

Figure 1:
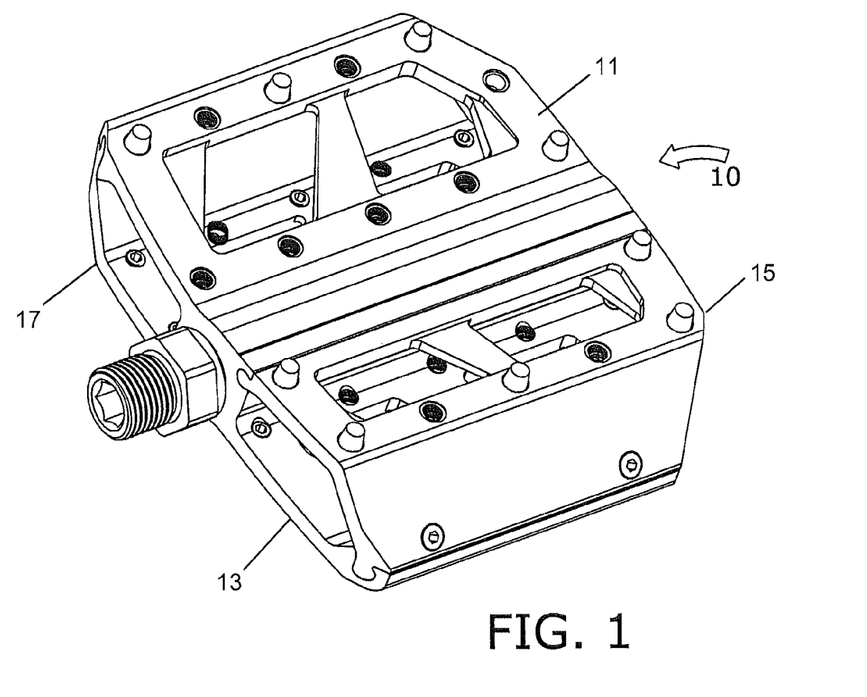
FIG. 1 is a perspective view of a bicycle platform pedal assembly in accordance with the preferred embodiment.

FIG. 1 shows a bicycle platform pedal 10 according to an embodiment of the invention. Pedal 10 includes an upper portion 11 and a lower portion 13. Note that pedal 10 is shown as a right pedal as an example. Pedal 10 also includes an upper rear section 15 and a lower forward section 17.

Figure 2:
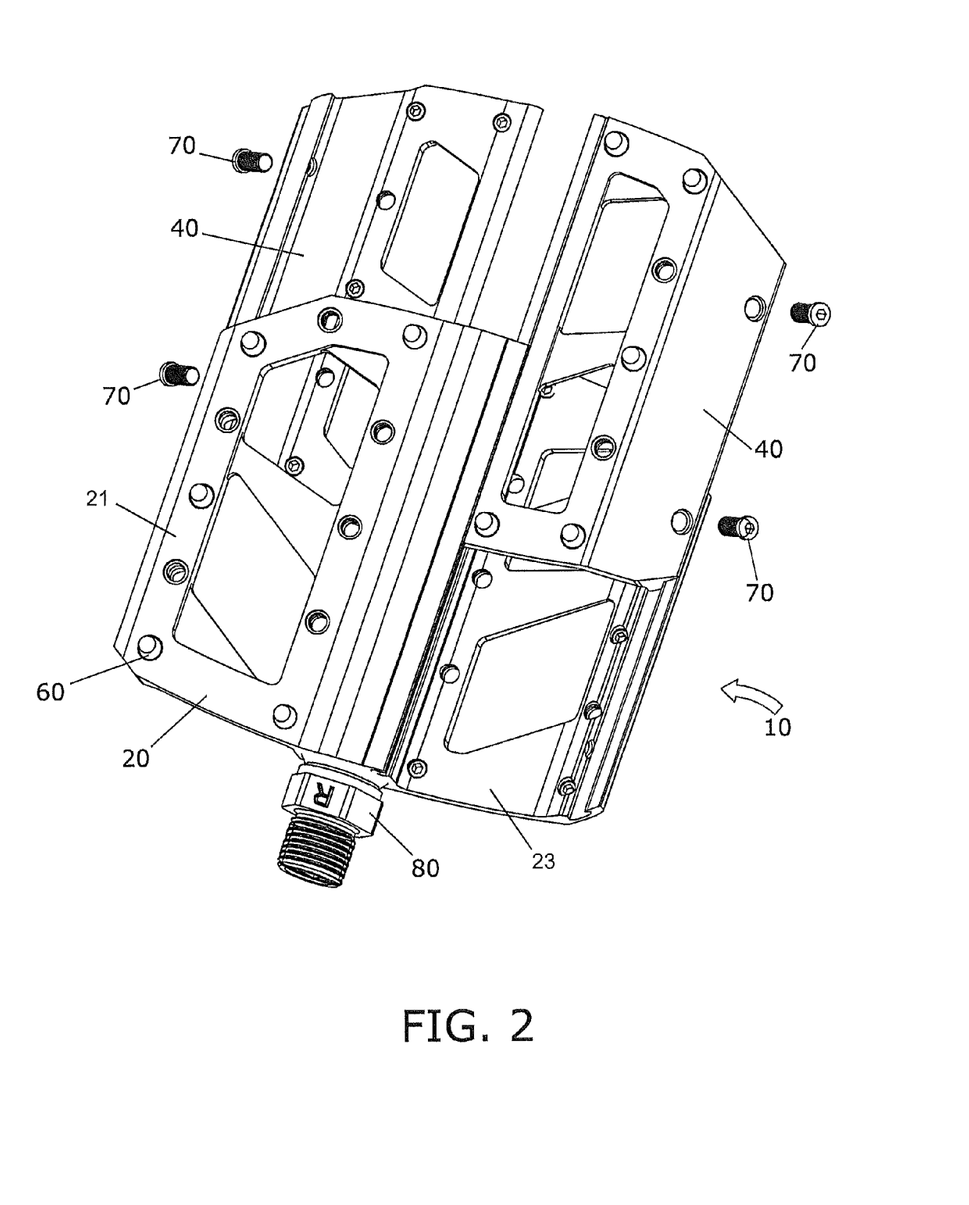
FIG. 2 is a partially exploded perspective view of the novel platform pedal shown in FIG. 1.

FIG. 2 shows the platform pedal 10, which is partially comprised of a body 20, first and second plates 40, traction screws 60, screws 70, and a spindle 80. Body 20 includes outer surfaces 21 and inner surfaces 23 (also shown in FIG. 4). It can be seen that after the four screws 70 are removed, the first and second plates 40 slide off of body 20. In the preferred embodiment, the first and second plates 40 are made of a harder, more durable material than material of the body 20. The plates 40 will tend to be impacted and scraped more than the body 20 because of the shape and location of the plates 40. In some instances, it would be preferred that the plates 40 are made of a low cost material such as injection molded plastic because the plates can be easily replaced. Even if the plates 40 are made of a relatively expensive material, it is still less costly to replace a damaged plate 20 of the present invention than a damaged prior art body.

Figure 3:
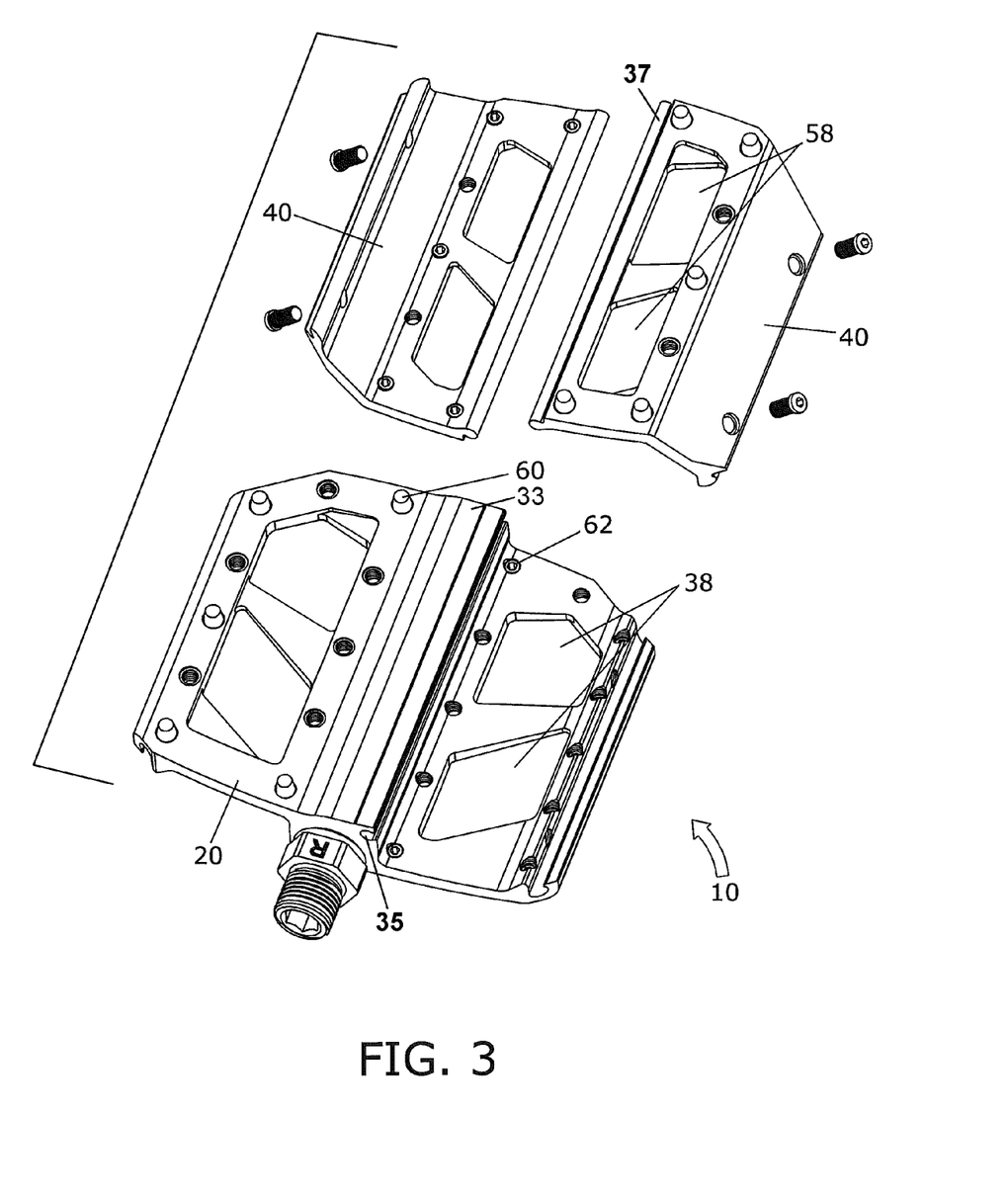
FIG. 3 is a perspective view of the novel platform pedal shown in FIG. 2, further exploded.

FIG. 3 shows the platform pedal 10 with the two plates 40 completely removed from the body 20. Notice that the underside of the hexes 62 of traction screws 60 can be easily accessed. There are manufacturing options available for making body 20 and plates 40 that are not available for making a prior art body. A prior art body is typically either die cast or extruded and then CNC machined, because of the one piece body structure. Plate 40 can be die cast or extruded and then CNC machined, or in order to save cost, plate 40 could be extruded and then the cutouts 58 stamped so that only minimal machining would be necessary. It would also be possible to stamp plate 40 from sheet metal, which could be even less expensive. Body 20 could be die cast or extruded and then CNC machined, or in order to save cost, body 20 could be extruded and then the cutouts 38 stamped and then only minimal machining would be necessary. FIG. 3 also shows a central portion 33 of body 20 having a first groove 35 and plate 40 having a first tongue 37 corresponding to first groove 35.

Generally, die casting costs less than extruding and machining a part, but die cast parts cannot be anodized. Anodizing is more durable than paint, weighs less than paint, and many people believe anodizing has a better appearance than paint. However, anodizing costs more than paint. With this novel platform pedal, it would be possible to die cast the body 20, and then make the plates 40 in a way that allows anodizing such as extrusion and CNC. In this way, the pedal will have similar durability of a prior art pedal that is extruded and CNC machined, but with much less cost.

Figure 4:
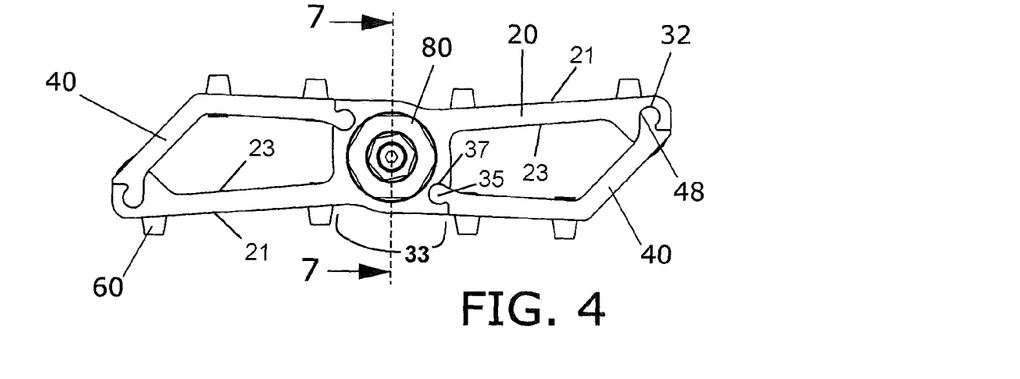
FIG. 4 is an end view of the platform pedal assembly in accordance with the preferred embodiment.

FIG. 4 shows how the tongue 48 of plate 40 fits into groove 32 of body 20, so that the first and second plates 40 can slide on and off of body 20. Also shown is first tongue 37 of plate 40 fitting into first groove 35 on central portion 33 of body 20. Spindle 80 and traction pins 60 are also shown.

FIG. 5 shows the body 20 and plate 40 of platform pedal 10 from above the pedal.

FIG. 6 shows the body 20 and plate 40 of platform pedal 10 from the side of the pedal.

FIG. 7 shows a cross sectional view of the platform pedal 10. Spindle 80 has a hex 82 for tightening thread 84 into a bicycle crank arm (not shown). Alternatively, hex 96 could be used in place of hex 82. Seal 100 has a lip 102 which seals spindle 80 to body 20. Bushing 110 has outer slots 112 (shown in FIG. 8) to allow grease to pass by, as will be later discussed. Spindle 80 is supported by bushing 110 and bearing 120, as is well known in the prior art. A nut 130 secures spindle 80 to bearing 120 within a cavity of the pedal that includes cavity 14 and cavity 16. A hex 142 in end cap 140 secures bearing 120 to body 20 and o-ring 160 seals end cap 140 to body 20. A screw 170 seals a hole in the center of end cap 140. Screw 170 can be removed to allow a grease gun tip to pump grease through end cap 140, into cavity 12, through recess 148, around groove 152 (best shown in FIG. 8), around bearing 120 via a slot 28 (shown in FIGS. 9 and 10), into cavity 14, through bushing 110, into cavity 16, and past lip 102 of seal 100. This re-greasing process flushes out the inside of the pedal assembly and applies a fresh coating of lubrication. After regreasing, screw 170 is screwed back into end cap 140. The novel part of the assembly shown in FIG. 7 is the way in which the pedal can be re-greased for maintenance, and in particular the way that screw 170 can be removed from end cap 140, and slot 28 (shown in FIGS. 9 and 10) that allows grease to go around sealed bearing 120. Without slot 28, it would be very difficult to pump grease past sealed bearing 120.

Figure 8:
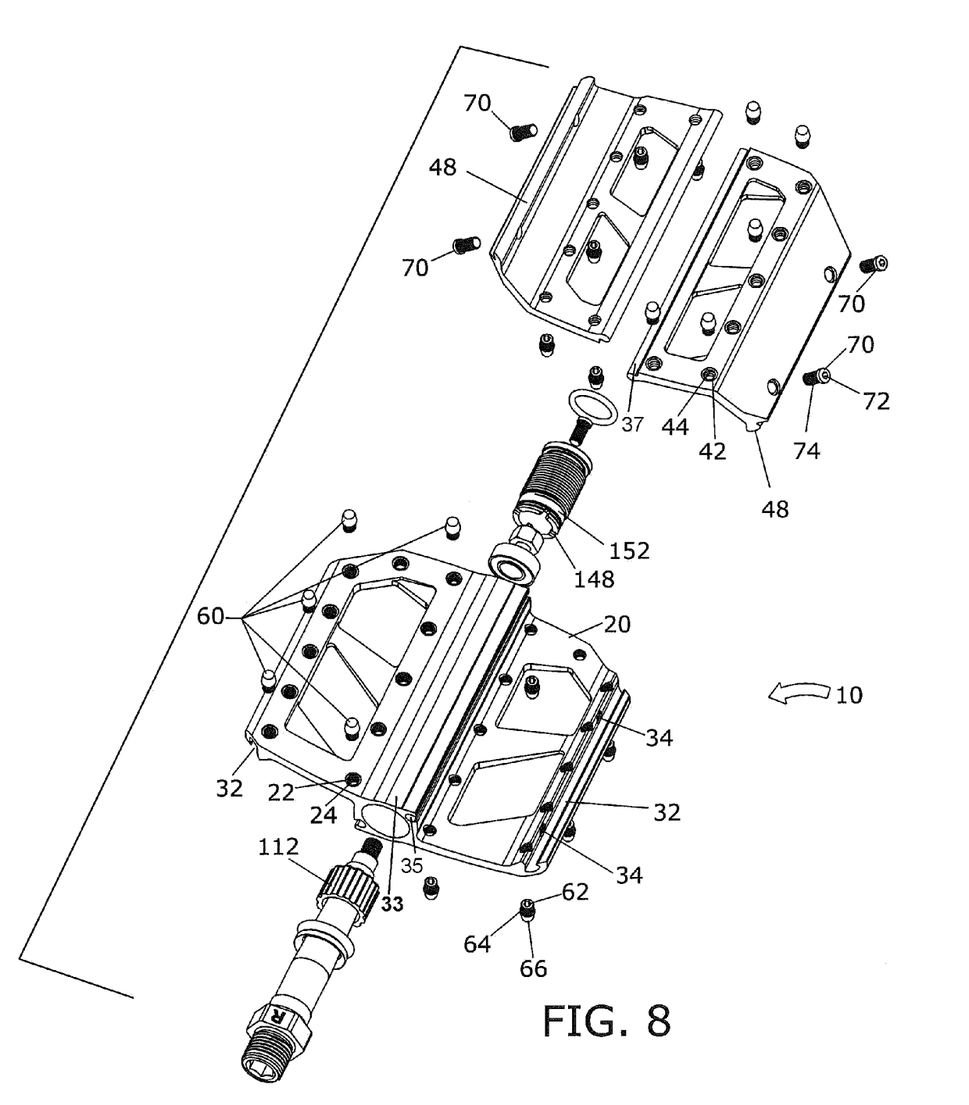
FIG. 8 is an exploded perspective view of the platform pedal assembly shown in FIG. 1.

FIG. 8 shows platform pedal 10 exploded. There are five traction pins 60 that can be mounted within recesses 22 into threaded holes 24 to each side of body 20. However, body 20 has another six threaded holes 24 per side, so that the rider could have up to eleven traction pins 60 per side of body 20, or place any quantity less than eleven traction pins 60 per personal preference. Similarly, there are five traction pins 60 exploded from each plate 40, but each plate 40 can hold up to seven traction pins 60 in recesses 42 of threaded holes 44. Therefore, platform pedal 1 Q has ten traction pins 60 per side of the assembled pedal, but could have up to eighteen traction pins 60 per side, or allow a large variety of pin placements for the rider using fewer than eighteen traction pins 60. All traction pins 60 have a traction head 66, a thread 64, and a hex 62 located on the underside so that there is easy access for installation and removal when plates 40 are removed. Two screws 70 with threads 74 are used to secure each plate 40 to body 20 by screwing into threads 34 with a hex 72. Body 20 has two grooves 32 that tongue 48 of plates 40 slide into. Bushing 110 has outer slots 112 to allow grease to pass by. FIG. 8 also shows central portion 33 of body 20 having first groove 35 and plate 40 having first tongue 37 corresponding to first groove 35 with similar structures on the other side of central portion 33.

Figure 9:
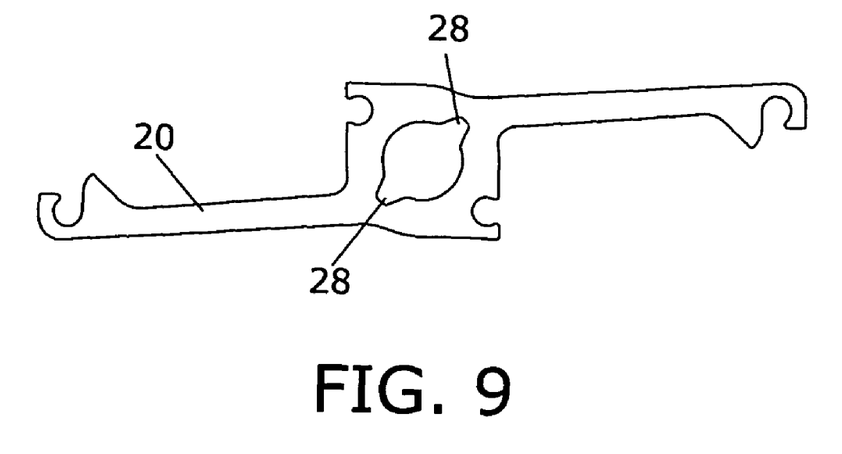
FIG. 9 is an end view of the extrusion used for making the body component of the platform pedal assembly shown in FIG. 1.

FIG. 9 shows the extrusion used for making body 20 with slots 28.

Figure 10:
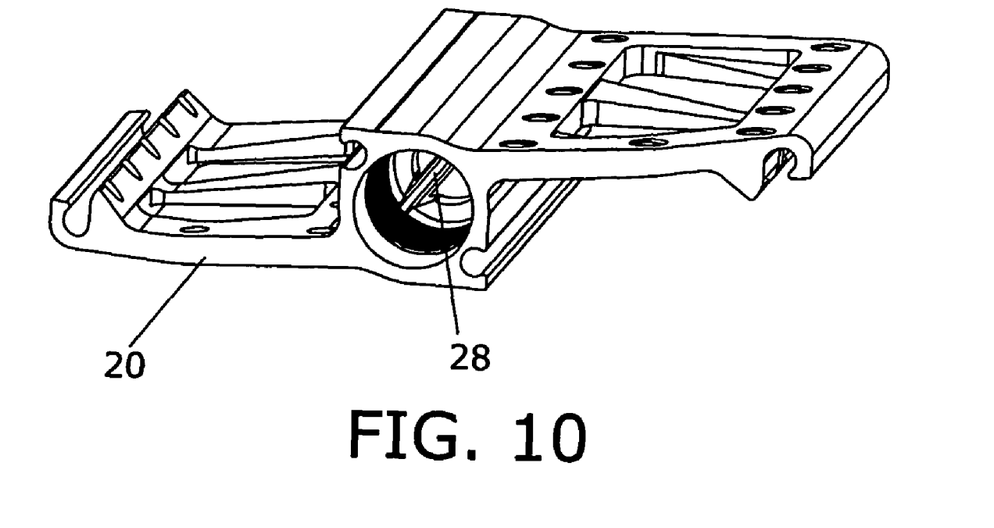
FIG. 10 is a perspective view of the body component of the platform pedal assembly shown in FIG. 1.

FIG. 10 shows body 20 after it has been machined. Slot 28 partially remains so that grease can flow around bearing 120 during re-greasing.

Figure 11:
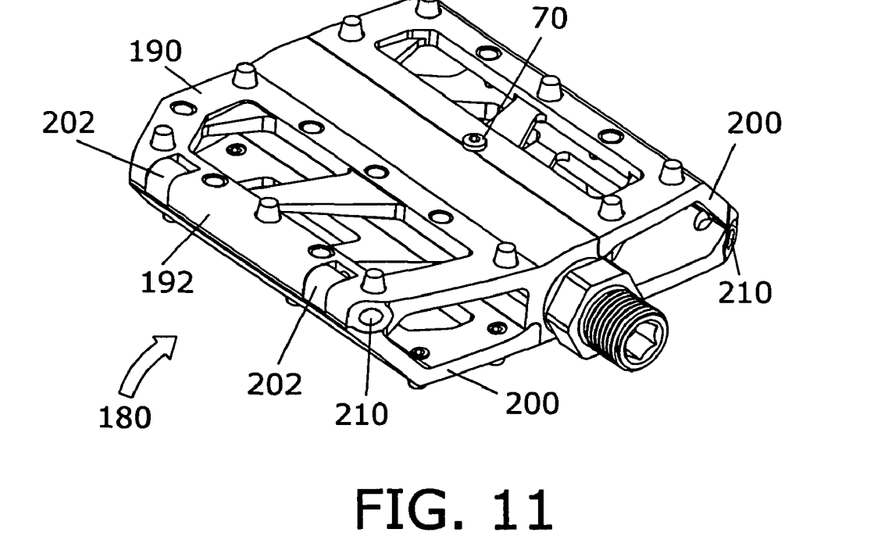
FIG. 11 shows a hinged plate embodiment of the invention.

FIG. 11 shows the hinges plate embodiment 180 of the invention. Platform pedal 180 has a pin 210 that connects body 190 hinge 192 to plate 200 hinge 202. A screw 70 on each side of the body 190 secures a plate 200 closed to body 190.

Figure 12:
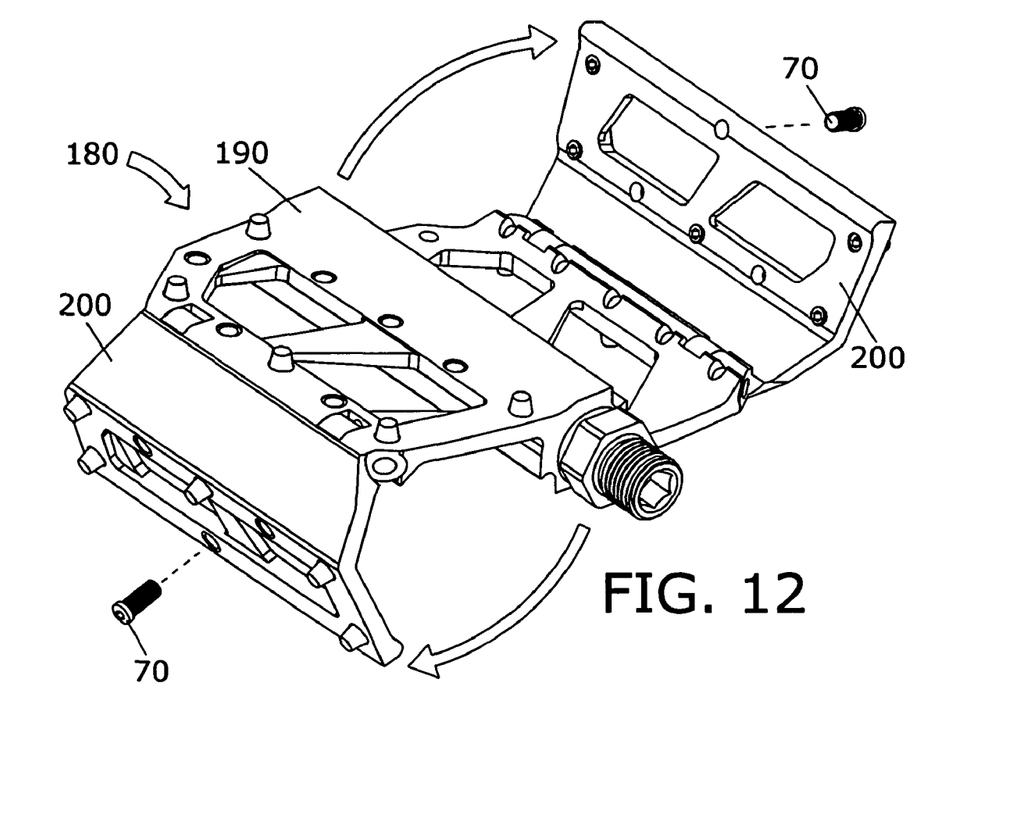
FIG. 12 shows the hinged plate embodiment of the invention with the plates hinged open.

FIG. 12 shows the hinges plate embodiment 180 with plates 200 hinged open from body 190, giving improved access to the inside of pedal 180. Screws 70 were removed in order to hinge plates 200 open.

Those skilled in the art will readily perceive other embodiments. For example, instead of plates 40 sliding into the body 20 with a tongue and groove system, the plates could be simply fastened directly to the body. The plates could also be hinged to the body and then fastened closed (See FIGS. 11 and 12).

Bushing 110 could alternatively be a needle bearing as is well known in the prior art. A needle bearing would also allow grease to pass by during the re-greasing process described.

The preferred embodiment shows eighteen different positions for traction pins 60 per side of the pedal, but the novelty of this pedal does not depend on the exact number of traction pin locations.

It will thus be evident that there are many additional embodiments which are not illustrated above but which are clearly within the scope and spirit of the present invention. The above description and drawings are therefore intended to be exemplary only and the scope of the invention is to be limited solely by the appended claims and their equivalents.

The invention claimed is:

1. A bicycle pedal comprising:
   a unitary body having a central portion for receiving a spindle for attachment to a bicycle crank arm and an inner surface and an outer surface extending from the central portion, wherein the central portion has a first groove and the inner surface has a second groove;
   a plurality of traction pins extending through a plurality of threaded holes in the outer surface; and
   at least one plate having a first tongue corresponding to the first groove and a second tongue corresponding to the second groove, wherein the plate is displacably attached to said body opposing the outer surface of the body.

2. The bicycle pedal recited in claim 1 wherein said at least one plate has material properties different than material properties of said body.

3. The bicycle pedal recited in claim 1 wherein said at least one plate is in a location of said pedal subjected to the most wear during normal use.

4. The bicycle pedal recited in claim 1 wherein said at least one plate is attached to said body by a tongue and groove interface.

5. The bicycle pedal recited in claim 1 wherein said at least one plate is made of a material that is different from the material of said body.

6. The bicycle pedal recited in claim 1 wherein said at least one plate is made of a material that is harder than the material of said body.

7. The bicycle pedal recited in claim 1 wherein said at least one plate is at least partially fabricated by a stamping operation.

8. The bicycle pedal recited in claim 1 wherein said at least one plate is made of a material which has greater density than the material of said body.

9. The bicycle pedal recited in claim 1, wherein said at least one plate is configured for providing improved access to said traction pins upon removal from said body.

10. The bicycle pedal recited in claim 1 wherein said at least one plate has a color that is different from the color of said body.

11. The bicycle pedal recited in claim 1 wherein said at least one plate has a surface finish that is different from the surface finish of said body.

12. The bicycle pedal recited in claim 1 wherein said at least one plate is fabricated by a process which is different from the process of fabricating the body.

13. The bicycle pedal recited in claim 1, wherein the at least one plate is at a bottom forward portion of the pedal.

14. The bicycle pedal recited in claim 1, wherein the at least one plate comprises a first portion extending from the outer surface to form a platform for a user and a second portion angled away from the platform.

15. The bicycle pedal recited in claim 1, wherein the at least one plate comprises a first plate and a second plate, the first plate located at a front lower section of the pedal and the second plate located at a rear upper section of the pedal.

16. A bicycle pedal comprising:
- a body having an upper portion on a first plane and a lower portion on a second plane on opposite sides of a central portion receiving a spindle, wherein the central portion comprises a first groove on each side of the spindle and the upper and lower portions each comprise a second groove;
- a first removably attached plate along the first plane and overlying the lower portion, wherein the first removably attached plate is at an upper rear section of the pedal and has a first tongue corresponding to one of the first grooves on the central portion and a second tongue corresponding to the second groove on the upper portion; and
- a second removably attached plate along the second plane and overlying the upper portion, wherein the second removably attached plate is at a lower forward section of the pedal and has a first tongue corresponding to another one of the first grooves on the central portion and a second tongue corresponding to the second groove on the lower portion.

17. The bicycle pedal recited in claim 16 wherein said first and second removably attached plates are secured by a tongue and groove interface.

18. The bicycle pedal recited in claim 16 wherein said first and second removably attached plates have material properties different from the remaining material of said pedal.

19. The bicycle pedal recited in claim 16 wherein said first and second removably attached plates are made of a material that is different from the remaining material of said pedal.

20. The bicycle pedal recited in claim 16 wherein said first and second removably attached plates are made of a material that is harder than the remaining material of said pedal.

21. The bicycle pedal recited in claim 16 wherein said first and second removably attached plates are at least partially fabricated by a stamping operation.

22. The bicycle pedal recited in claim 16 wherein said first and second removably attached plates are made of a material which has greater density than the remaining material of said pedal.

23. The bicycle pedal recited in claim 16 further comprising a plurality of traction pins extending through the first and second plates.

24. The bicycle pedal recited in claim 16 wherein said first and second removably attached plates have a color that is different from the color of other portions of said pedal.

25. The bicycle pedal recited in claim 16 wherein said first and second removably attached plates have a surface finish that is different from the surface finish of other portions of said pedal.

26. The bicycle pedal recited in claim 16 wherein first and second removably attached plates are fabricated by a process which is different from the process of fabricating other portions of said pedal.

* * * * *